United States Patent [19]

Delvaux et al.

[11] Patent Number: 5,076,986

[45] Date of Patent: Dec. 31, 1991

[54] PROCESS FOR MANUFACTURING A COMPOSITE MATERIAL

[75] Inventors: Pierre Delvaux, Bromptonville; Normand Lesmerises; Luc Desrosiers, both of Rock Forest, all of Canada

[73] Assignee: Ceram SNA Inc., Bromptonville, Canada

[21] Appl. No.: 592,698

[22] Filed: Oct. 3, 1990

[51] Int. Cl.$^5$ .......................... B28B 1/00; C04B 16/08
[52] U.S. Cl. .................................. 264/122; 106/675; 106/698; 264/333
[58] Field of Search ............... 106/675, 698, 699, 716, 106/631, 626, DIG. 2; 264/333, 122, 110

[56] References Cited

U.S. PATENT DOCUMENTS

| | | | |
|---|---|---|---|
| 2,360,645 | 10/1944 | Bruce et al. | 260/38 |
| 2,586,150 | 2/1952 | Cofek | 260/38 |
| 2,973,336 | 2/1961 | Delaplace et al. | 260/38 |
| 3,224,927 | 12/1965 | Brown et al. | 162/155 |
| 3,297,599 | 1/1967 | Eschen | 260/3 |
| 3,326,843 | 6/1967 | Barnett et al. | 260/38 |
| 3,353,975 | 11/1967 | Shannon et al. | 106/675 |
| 3,367,871 | 2/1968 | Mueller et al. | 252/62 |
| 3,448,071 | 6/1969 | Keller | 260/38 |
| 3,492,262 | 1/1970 | Griffith | 260/38 |
| 3,565,650 | 2/1971 | Cordon | 106/675 |
| 3,616,173 | 10/1971 | Green et al. | 161/162 |
| 3,661,603 | 5/1972 | Nicol | 106/90 |
| 3,682,667 | 8/1972 | Roberts et al. | 106/67 |
| 3,718,491 | 2/1973 | Yates | 106/631 |
| 3,809,566 | 5/1974 | Revord | 106/783 |
| 3,842,031 | 10/1974 | Lumb et al. | 260/38 |
| 3,933,515 | 1/1976 | Yang | 106/99 |
| 3,954,556 | 5/1976 | Jackson et al. | 162/145 |
| 4,101,335 | 7/1978 | Barrable | 106/716 |
| 4,107,376 | 8/1978 | Ishikawa | 428/306 |
| 4,111,891 | 9/1978 | Reynolds, Jr. | 260/38 |
| 4,119,591 | 10/1978 | Aldrich | 260/17.2 |
| 4,128,524 | 12/1978 | Barnett et al. | 106/DIG. 2 |
| 4,175,070 | 11/1979 | Klein et al. | 260/38 |
| 4,255,197 | 3/1981 | Peralta et al. | 106/41 |
| 4,274,881 | 6/1981 | Langton et al. | 106/98 |
| 4,277,596 | 7/1981 | Lalancette | 528/106 |
| 4,320,022 | 3/1982 | Aitcin | 252/62.59 |
| 4,363,738 | 12/1982 | Kummermehr | 252/62 |
| 4,430,157 | 2/1984 | Lalancette | 162/145 |
| 4,461,643 | 7/1984 | Kaufman | 106/36 |
| 4,519,811 | 5/1985 | Lalancette et al. | 51/309 |
| 4,604,140 | 8/1986 | Lalancette et al. | 106/38.9 |
| 4,710,309 | 12/1987 | Miller | 252/62 |
| 4,722,866 | 2/1988 | Wilson et al. | 428/411.1 |

FOREIGN PATENT DOCUMENTS

| | | |
|---|---|---|
| 47728 | 3/1982 | European Pat. Off. |
| 49-074280 | 7/1974 | Japan . |
| 57-160977 | 10/1982 | Japan . |
| 57-205380 | 12/1982 | Japan . |
| 58-020784 | 2/1983 | Japan . |
| 60-92332 | 5/1985 | Japan . |
| 61-66764 | 4/1986 | Japan . |
| 61-77653 | 4/1986 | Japan . |
| 63-225647 | 9/1988 | Japan . |
| 63-225649 | 9/1988 | Japan . |
| 837973 | 7/1979 | U.S.S.R. . |
| 1172907 | 8/1985 | U.S.S.R. . |

Primary Examiner—Mary Lynn Theisen
Attorney, Agent, or Firm—Foley & Lardner

[57] ABSTRACT

A process for manufacturing composite materials of high quality whatever be the respective amount, proportion and kind of constituents used in the starting mixture which comprises a binder made of two components capable of reacting with each other, at least one of these two components being in a liquid form, at least one filler, and reinforcing fibers, the binder being selected from the group of binders made of the following components: hydraulic cement and water; potassium and sodium silicate and water, colloidal silica and water; and organic resins and resin hardeners or catalysts. According to this process, all the liquid component of the binder is impregnated into an absorbing substance preferably consisting of vermiculite, which is compatible with the binder, the filler and the fibers. Then, the absorbing substance impregnated with the liquid component of the binder, is mixed with the solid component of the binder, the filler and the fibers in a mixer for a period of time sufficient to obtain the requested starting mixture in a semidry and homogeneous form, in which the fibers are entirely dispersed. The semidry mixture that is so obtained is then introduced into a mold and compressed under pressure for a period of time depending on the composition of the starting mixture and the predetermined properties of the composite material to be obtained. Last of all, the compressed material may be subjected to ageing and/or hardening as a function of the binder being used in order to obtain the desired composite material.

16 Claims, No Drawings

PROCESS FOR MANUFACTURING A COMPOSITE MATERIAL

BACKGROUND OF THE INVENTION a) Field of the Invention

The present invention relates to a process for manufacturing a composite material from a mixture comprising:

a binder made up of two components capable of reacting with each other, at least one of these two components being in a liquid form;

at least one filler; and reinforcing fibers.

b) Brief Description of the Prior Art

The manufacture of composite materials from mixtures of the above mentioned type, has been known for a very long time.

In the particular case of asbestos cement which is one of the composite materials that has the most widely been used throughout the world since the beginning of this century, the different components of the mixture used as starting material, are:

a binder consisting of hydraulic cement and water;

fillers; and asbestos fibers used as such or in combination with other fibers, such as cellulose fibers.

In this particular case, the binder usually comprises a hydraulic cement, which may consist of Portland cement. The binder has a solid part and a liquid part, this liquid part being water. The solid part may consist of cement only, which is mixed with water and subject to ageing under ambient pressure and temperature. The solid part of the binder may also consist of a mixture of Portland cement with silica sand, usually in a ratio of 60 to 40. The mixture is subjected to ageing under hydrothermic condition (autoclaved steam curing).

The fillers that are used in the starting mixture for the manufacture of asbestos cement, usually consist of dyes for coloring the finished product, and of inert fillers whose purpose is to reduce the amount of raw material being used and thus reduce the cost of the finished product. These inert fillers may consist of chunks of finished product rejects, sand, calcium carbonate, clay, perlite, etc...

The reinforcing fibers that are used, consist of asbestos fibers of commercial grade, of the chrysotile, crocidolite or amosite type. For some application, cellulose fibers may also be mixed with the asbestos fibers.

The processes that are presently being used for the manufacture of pieces of equipment made from such a composite material, viz. asbestos cement, starting from the above described mixture, are, on the one hand, a process named after its inventor, Mr. HATSCHEK, which process is commonly used for the manufacture of sheets, and a process also named after its inventor, Mr. MAZZA, for the manufacture of sleeves and pipes.

In both of these processes, an aqueous suspension of asbestos fibers and hydraulic cement, having a concentration of about 3 to 10% by weight of solids, is filtered into a rotating cylindrical sieve. The sheet of dry material that is recovered on the rotating sieve is placed on a felt conveyor and wound up onto a calendering cylinder until a sleeve of the desired thickness is obtained. To produce sheets, the dry substance that is wound up onto the calendering cylinder is cut, unwound and subsequently subjected to forming and ageing. To produce pipes, the dry substance wound onto the calendering cylinder is subjected to ageing, then removed from the cylinder and subsequently treated, if desired.

The above mentioned processes call for substantial investment in machinery and space. Usually, the HATSCHEK machines are capable of producing from 3 to 12 tons per hour, and therefore cannot be used for manufacturing products in small quantities, but rather in applications requiring high specificity.

Therefore, other processes have been proposed for processing smaller amounts of asbestos cement. An example of such a process is disclosed, by way of example, in British patent No. 1,083,809.

Over the last decades, asbestos fibers have been banned from different countries because of alleged health hazards. As a result, other types of composite materials have been developed, starting from mixtures that can be processed as disclosed hereinabove. The compositions of these other mixtures are very similar to that of asbestos cement, except that the reinforced fibers that are used are not made of asbestos but of other material. By way of example, reference can be made to U.S. Pat. No. 4,414,031 which discloses a fiber-reinforced cement whose reinforced fibers are made of polyacrylonitrile, and U.S. Pat. No. 3,974,024 which discloses a process of manufacture glass fibers cement.

In the cases of composite materials making use of inorganic binders other than cement and water, such as sodium or potassium silicate and water, or colloidal silica and water, other processes have been developed.

In the cases of composite materials making use of organic binders, such as, for example, polyester or epoxy resin and a catalyst or hardener, other processes have also been developed.

As a matter of fact, for each existing composite material, there is one very specific process of manufacture, this process being, most of the time, restricted to the said very composite material. In other words, a process for use to manufacture a given amount of a particular composite material can very seldomly be used to manufacture other composite materials. Sometimes, such a process cannot even be used to manufacture the same composite material if the amount of this composite material to be manufactured is increased or reduced.

Thus, by way of example, the composite material whose formulation is given in U.S. Pat. No. 3,974,024 cannot be manufactured by the process disclosed in U.S. Pat. No. 4,414,031 and vice versa.

Moreover, the processes useful for mass production and making use of a substantial amount of water, such as the HATSCHEK process, often lead to segregation and sedimentation of the materials being processed, when one tries to process some other particles or fibers, or tries to reduce the amount of materials to be processed.

Similarly, processes like the one disclosed in British Pat. No. 1,083,809 for use to process a mixture containing a small amount of moisture, often lead to the formation of "chunks" or aggregates of fibers in the mixture if use is made of other kind of fibers or other binders, or, more particularly, if one tries to increase the amount of mixture being processed at one time.

OBJECT AND SUMMARY OF THE INVENTION

The main object of the present invention is to provide a process of manufacture which can be disclosed as being of a "semidry" molding type, which process permits production of composite materials of a high quality whatever the amount, proportion and kind of constituents of the starting mixture being used, provided of course that the binder, filler(s) and fibers be chemically compatible with each other and properly selected to give the composite material to be manufactured, its desired structure and properties.

More particularly, the invention provides the process for manufacturing a composite material from a mixture comprising:
- a binder made up of two components capable of reacting with each other, at least one of these two components being in a liquid form;
- at least one but preferably several fillers; and
- reinforcing fibers such as asbestos fibers, asbestos-derivative fibers, cellulose fibers, glass fibers or plastic fibers, the binder being selected from the group of binders made of the following components:
- hydraulic cement and water;
- potassium and sodium silicate and water;
- colloidal silica and water; and
- organic resins and hardeners or catalysts for such resins,
- the filler(s) and fiber(s) being selected to be chemically compatible with the binder and to give the composite material some predetermined structure and properties.

In accordance with the invention, this process comprises the steps of:
- impregnating all of the liquid component of the binder into an absorbing substance compatible with the binder, filler(s) and fibers, this absorbing substance being vermiculite, perlite or any similar material and constituting the filler or being a part thereof;
- mixing the absorbing substance impregnated with the liquid component of the binder with the solid component of the binder, if any, with the filler(s) and with the fibers in a mixer for a period of time sufficient to obtain the requested mixture in a semidry and homogeneous form, in which the fibers are entirely dispersed;
- introducing the semi-dry mixture into a mold of a press and compressing the mixture under a pressure and for a period of time depending on the composition of the mixture and the predetermined properties of the composite material to be obtained; and
- subjecting the compressed material to ageing and hardening as a function of the kind of binder being used, in order to obtain the desired composite material.

The process according to the invention is particularly advantageous in that it can easily be used with any kind of starting mixture, in addition of being independent of the amount to be processed.

Due to its simplicity and its versatility, the process according to the invention can be carried out at low cost, and a great number of composite materials of very different compositions can be processed with the same equipment.

Moreover, tests carried out by the Applicant have shown that the mechanical properties of the composite materials obtained by the process according to the invention, are at least equal, and sometimes superior to those of the composite materials manufactured by the conventional processes, because of the excellent homogeneity of the mixture that is obtained with the process according to the invention.

DETAILED DESCRIPTION OF THE INVENTION

The first and main step of the process according to the invention, consists in letting the liquid component of the binder impregnate an absorbing substance that can be of any type, provided that it is compatible with the other components of the composite materials to be manufactured. As such a substance, use can be made of perlite or preferably vermiculite. When vermiculite is used, it is preferably in expanded form, like the one sold under the trade name Grace No. 3. Of course, other kinds of absorbing substances may be used if desired, such as expanded perlite or diatomeous earth.

The amount of absorbing substance used in the process according to the invention is selected in such a manner as to allow full absorption of the liquid component of the binder. Of course, the amount of such a liquid component depends on the amount of solid component of the binder which, in turn, depends on the amount of composite material to be manufactured.

According to the invention, it is important that the absorbing substance be used in such an amount that the substance keeps the same "dry" aspect before and after absorption of the liquid component of the binder.

In practice, the respective amounts of absorbing substance and liquid which, of course, depend on the kind of composite material to be manufactured, have to be properly defined since too much absorbing substance may affect the structural characteristics of the composite material, in addition of preventing the same from being properly manufactured. On the other hand, not enough absorbing substance may prevent part of the liquid component of the binder from being absorbed and may lead to the formation of aggregates in the subsequent steps of the process, which is to be avoided.

Once the impregnation step is completed, the other components of the composite material are introduced into a mixer which is preferably a mortar or cement mixer, and mixed therein as long as necessary to achieve perfect homogeneity. The advantage of the process according to the invention is that such a mixing inside the mixer can be made in a "semidry" manner, because of the liquid absorption that was previously carried out, thereby resulting in a homogenous mixture where the reinforcing fibers are well dispersed.

Because the liquid component of the binder is absorbed, segregation or sedimentation of particles and fibers is avoided. This makes the process according to the invention quite different from the processes making use of a large amount of water, such as the one disclosed in U.S. Pat. No. 4,141,031. Moreover, the process according to the invention prevents the formation of fibrous aggregates in the starting mixture when use is made of a small amount of moisture only, as occurs in the process disclosed in British Pat. No. 1,083,809.

The dry mixture that is obtained in the mixing step is then introduced into the mold of a press and compressed to the requested pressure for the period of time necessary to achieve the desired molding. The pressure exerted onto the mixture causes the liquid component of the binder to be expelled from the absorbing substance thereby reacting with the solid component of the binder. Of course, by properly adjusting the strength of compression, one can also adjust the density of the finished product.

The products that are mold-shaped, may finally be subjected to ageing and hardening. The conditions of such ageing and hardening are known per se and dependent on the kind of binder that is used.

As may be understood, the process according to the invention is very simple to carry out with low cost equipment. Because mixing of the components of the starting mixture is made in a "semidry" form, excellent homogeneity of the mixture is achieved, as compared to the prior art processes where aggregates may be formed because of the presence of the liquid component of the binder. Moreover, the amount of each components may be adjusted at will.

Canadian Pat. No. 1,235,149 issued on Apr. 12, 1988 in the name of the Applicant, discloses the addition of vermiculite as an inert filler, to a starting mixture for use to manufacture and mold a reaction product of phosphoric acid with magnesium silicate in granular form. Although the two main purposes of this addition are to control the speed of reaction of the phosphoric acid with the magnesium silicate and to adjust the density of the shaped product to any predetermined value, the patent also discloses that vermiculite and its substitutes such as perlite, have a high absorbing power making it necessary to use significant amount of phosphoric acid, which is of course in liquid form.

In examples 2, 6 and 9 of this patent, the manufacture of some structural components is disclosed, comprising mixing of magnesium silicate with vermiculite previously impregnated with phosphoric acid; pressing in a mold of the homogenous mixture obtained after mixing; and curing of the compressed product in a microwave oven.

Although this patent seems to suggest a sequence of steps very similar to the process according to the invention, one can see that, on the one hand, the starting mixture that is being used is very different from those specifically claimed hereinafter and that, on the other hand, the resulting product is not a composite material as claimed hereinafter, but rather a reaction product, i.e. a product resulting from the reaction of all the components of the starting mixture with each other, as compared to the invention where only the two components of the binder react with each other.

Moreover, if this patent does disclose that vermiculite absorbs phosphoric acid, it does not disclose or suggest the advantages that derive from such an absorption, nor the way these advantages may be used for mixing fibers known to be difficult to mix with a binder and fillers. As a matter of fact, this patent suggests to use vermiculite only for the two main purposes mentioned hereinabove.

Accordingly, this patent, although relevant, cannot be considered as anticipatory.

The following non restrictive examples are illustrative of some applications of the process according to the invention.

EXAMPLE 1

Sheets of asbestos concrete were manufactured as disclosed hereinafter.

The composition of the starting mixture used for the manufacture of these sheets was as follows:

| Components | Weight (kg) |
|---|---|
| Vermiculite (Grace No. 3): | 0.100 |
| Water: | 0.306 |
| Portland cement No. 10: | 1.800 |
| Chrysotile fiber (grade 4): | 1.019 to 2.800 |

An amount of 0.306 kilogram of water is necessary to achieve hydraulic reaction of 1.800 kilogram of Portland cement. An amount of 0.100 kilogram of vermiculite (Grace No.3) is the minimum amount of vermiculite that was found to be necessary to absorb the above mentioned amount of water (0.306 kilogram) while keeping a dry aspect.

Vermiculite was first introduced into a concrete mixer (MONARCH®, model 14Y type A), having a capacity of 0.175 cubic meter. Then, water was poured. The mixture of water and vermiculite was homogenized for 30 seconds and immediately after cement was introduced and homogenized for 30 seconds.

The chrysotile asbestos fibers (grade 4) were subsequently introduced into the mixture and subjected to homogenization for 120 seconds. The chrysotile fibers had previously been treated in a defibrator of the Willow type (FOURNIER®, model No. V-7000). The amount of chrysotile fiber that was added to each mixture of vermiculite, water and cement ranged from 0.019 to 2.800 kg, in order to prepare mixtures having 1, 5, 10, 15, 20, 30, 40, 50 and 60 % by weight of fibers respectively with respect to the total weight of solid materials in the mixture.

Two kilograms of each mixture that was so prepared, were introduced into the 20 cm×40 cm mold of a press and compressed to a pressure of 7 MPa for 10 minutes. The temperature of the mold was held between 50 and 60° C. during compression. The sheet that was so produced was removed from the mold and subjected to ageing for 28 days under a 100% relative moisture atmosphere at a temperature of 22° C.

The mechanical characteristics of the sheets that were so obtained are given in table I. The flexural strengths were measured according to ASTM D790 while the impact strengths were measured according to ASTM D256.

TABLE I

| COMPOSITION | Normal curing asbestos cement | | | | |
|---|---|---|---|---|---|
| | TECHNICAL PROPERTIES | | | | |
| ASBESTOS | DENSITY | FLEXURAL STRENGTH (MPa) | | IMPACT STRENGTH (kgcm/cm$^2$) | |
| FIBER (%) | g/cc | DRY | SATURATED | DRY | SATURATED |
| 1 | 1.92 | 17.3 | 7.5 | 1.27 | 1.37 |
| 5 | 1.91 | 24.9 | 13.5 | 1.50 | 2.12 |
| 10 | 1.88 | 31.9 | 19.2 | 3.23 | 3.89 |
| 15 | 1.87 | 31.3 | 19.6 | 4.20 | 5.28 |
| 20 | 1.82 | 39.0 | 25.2 | 5.59 | 6.44 |
| 30 | 1.85 | 47.9 | 28.5 | 7.40 | 9.05 |
| 40 | 1.81 | 52.8 | 29.1 | 9.03 | 10.35 |
| 50 | 1.76 | 46.8 | 25.6 | 12.58 | 12.01 |

TABLE I-continued

| COMPOSITION | Normal curing asbestos cement TECHNICAL PROPERTIES | | | | |
|---|---|---|---|---|---|
| ASBESTOS FIBER (%) | DENSITY g/cc | FLEXURAL STRENGTH (MPa) | | IMPACT STRENGTH (kgcm/cm$^2$) | |
| | | DRY | SATURATED | DRY | SATURATED |
| 60 | 1.79 | 44.2 | 25.8 | 9.64 | 12.10 |

EXAMPLE 2

Sheets of silico-calcareous asbestos cement were manufactured from mixtures having the following composition:

| Components | Weight (kg) |
|---|---|
| Vermiculite (Grace No. 3): | 0.100 |
| Water: | 0.306 |
| Portland Cement No. 10: | 1.080 |
| Silicate (Sil-Co-Sil 125): | 0.720 |
| Chrysotile fibers (grade 4): | 0.019 to 2.800 |

The same process of manufacture as disclosed above was used for manufacturing the sheets. After pressing, the sheets were subjected to ageing for 24 hours under a 100% relative moisture atmosphere at 22° C. Subsequently, they were inserted into an autoclave and subjected to saturating water vapor for 12 hours under a pressure of 8 kg/cm$^2$.

The mechanical characteristics of the sheets that were so obtained are given in table II.

TABLE II

| COMPOSITION | Steam curing asbestos cement TECHNICAL PROPERTIES | | |
|---|---|---|---|
| ASBESTOS FIBER (%) | DENSITY g/cc | FLEXURAL STRENGTH (MPa) DRY | IMPACT STRENGTH (kgcm/cm$^2$) DRY |
| 1 | 1.69 | 13.4 | 1.27 |
| 5 | 1.71 | 20.1 | 1.53 |
| 10 | 1.64 | 26.6 | 2.60 |
| 15 | 1.62 | 33.9 | 3.17 |
| 20 | 1.69 | 36.9 | 4.51 |
| 30 | 1.68 | 54.2 | 5.85 |
| 40 | 1.70 | 63.6 | 8.00 |
| 50 | 1.64 | 58.0 | 8.69 |
| 60 | 1.56 | 56.5 | 17.07 |

EXAMPLE 3 (comparison)

By way of comparison, sheets were produced from the same mixture as above, but on an Hatschek machine. Table III hereinafter gives the mechanical characteristics of the sheets that were so obtained.

In this particular case, the sheets were manufactured on a Hatschek machine having a rotating sieve manufactured by ISPRA. This machine manufactures sheets 120 cm long by 40 cm wide. The number of rotations of the calendering mandrel was adjusted to obtain sheets of about 0.5 cm. After such a manufacturing, the sheets were compressed at a pressure of 10 Mpa, subjected to ageing for 28 days and once again subjected to the same tests as previously described.

By comparing the data reported in tables I, II and III, one may note that the composite material containing 10% of chrysotile asbestos fibers that was prepared by the process according to the invention has mechanical properties, especially flexural and impact strengths, similar to the one produced with the Hatschek machine. Moreover, the sheets manufactured with the process according to the invention with a content of asbestos fibers equal to 60% have outstanding mechanical properties as compared to the others. By way of the comparison, the impact strength of the sheets that were so produced are almost four times better than those produced with a conventional Hatschek machine.

TABLE III

Comparative Formulation of asbestos cement Composition on Hatschek Machine Normal curing asbestos cement

| Composition | |
|---|---|
| Asbestos Fiber % | 10.5 |
| Cement % | 89.5 |
| Technical properties | |
| Density g/cc | 1.33 |
| Flexural Strength (MPa) | |
| Dry | |
| Cut longitudinally | 29.2 |
| Cut transversally | 24.4 |
| Average | 26.8 |
| Saturated | |
| Cut longitudinally | 24.8 |
| Cut transversally | 19.2 |
| Average 22.0 | |
| Average Dry Saturated | 24.4 |
| Impact Strength (kgcm/cm$^2$) | |
| Dry | |
| Cut longitudinally | 2.50 |
| Cut transversally | 3.00 |
| Average | 2.75 |
| Saturated | |
| Cut longitudinally | 2.80 |
| Cut transversally | 3.40 |
| Average | 3.10 |
| Average Dry Saturated | 2.93 |

EXAMPLE 4

Sheets of cellulose-fiber cement were manufactured by the process according to the invention.

The composition of the starting mixture used for this manufacture was as follows:

| Components | Weight (kg) |
|---|---|
| Vermiculite (Grace No. 3): | 0.100 |
| Water: | 0.306 |
| Portland cement (No. 10): | 1.800 |

-continued

| Components | Weight (kg) |
| --- | --- |
| Cellulose fibers: | 0.019 to 0.211 |

The sequence of steps to mix the components of the composite material was substantially as disclosed in example 1: water was first added to vermiculite and Portland cement, and the cellulose fibers were subsequently added to the vermiculite.

The cellulose fibers that were used, came from black spruces and were sold by Consolidated Bathurst. These fibers were treated in a defibrator (PALLMAN®, model No. REF/L-18) having a rotational speed of 13,000 rpm.

The amounts of cellulose fibers that were added to the mixtures being processed, ranged from 0.019 to 0.211 kg in order to produce mixtures having 1, 3, 5, 7, and 10 % by weight of fibers respectively with respect to the total weight of solid materials in the mixture.

Sheets were manufactured as disclosed in example 1, and subjected to ageing for 28 days in a 100% relative moisture atmosphere at a temperature of 22° C.

The mechanical characteristics of the manufactured sheets are given in table IV-A. By way of comparison, table IV-B gives the mechanical characteristics of sheets of asbestos fibers sold under the trademark HARDIFLEX®, which sheets were manufactured with a Hatschek machine.

TABLE IV-A

| COMPOSITION | Normal curing cellulose Fiber-cement | | | |
| --- | --- | --- | --- | --- |
| | | TECHNICAL PROPERTIES | | |
| CELLULOSE | DENSITY | FLEXURAL STRENGTH (MPa) | IMPACT STRENGTH (kgcm/cm$^2$) | |
| FIBER (%) | g/cc | DRY | DRY | SATURATED |
| 1 | 1.86 | 19.9 | 1.14 | 1.28 |
| 3 | 1.84 | 18.3 | 1.22 | 1.27 |
| 5 | 1.80 | 19.7 | 1.31 | 1.36 |
| 7 | 1.73 | 18.1 | 1.36 | 1.41 |
| 10 | 1.61 | 17.1 | 2.08 | 1.81 |

TABLE IV-B

| Technical properties | |
| --- | --- |
| Technical properties of HARDIFLEX® | |
| Density g/cc | 1.28 |
| Flexural Strength (MPa) | |
| Dry | |
| Cut longitudinally | 19.5 |
| Cut transversally | 16.3 |
| Average | 17.9 |
| Saturated | |
| Cut longitudinally | 14.7 |
| Cut transversally | 10.6 |
| Average | 12.7 |
| Average Dry and Saturated | 15.3 |
| Impact Strength (kgcm/cm$^2$) | |
| Dry | |
| Cut longitudinally | 0.60 |
| Cut transversally | 0.43 |
| Average | 0.52 |
| Saturated | |
| Cut longitudinally | 1.99 |
| Cut transversally | 1.03 |
| Average | 1.51 |
| Average Dry and Saturated | 1.02 |

The mechanical properties of the sheets containing 10% of cellulose fibers, that were produced with the process according to the invention, can advantageously be compared to the mechanical properties of the commercial sheets. Moreover, the process according to the invention permits to manufacture composite materials having a fiber content as low as 1%.

EXAMPLE 5

Sheets of polyvinyl alcohol fiber cement were manufactured by the process according to the invention.

The composition of the starting mixture used for the manufacture of these sheets was as follows:

| Components | Weight (kg) |
| --- | --- |
| Vermiculite (Grace No. 3): | 0.100 |
| Water: | 0.306 |
| Portland cement No. 10: | 1.800 |
| Polyvinyl alcohol fibers: | 0.019 to 0.211 |

The sequence of steps for mixing the components of the composite material was substantially as disclosed in example 1.

The polyvinyl alcohol fibers that were used, were those sold by TAF International under the trademark NEWLON grade AA. These fibers were added to the mixture without previous treatment.

The amounts of fibers that were added to the mixtures being processed, ranged from 0.019 to 0.211 kg in order to produce mixtures having 1, 3, 5, 8 and 10% by weight of solid materials in the mixture.

Sheets were manufactured as disclosed in example 1 and subjected to ageing for 28 days under a 100% moisture atmosphere at a temperature of 22° C. The mechanical characteristics of the slabs that were so manufactured are shown in table V.

TABLE V

| COMPOSITION | Normal curing PVA Fiber-cement | | | | |
| --- | --- | --- | --- | --- | --- |
| | | TECHNICAL PROPERTIES | | | |
| PVA | DENSITY | FLEXURAL STRENGTH (MPa) | | IMPACT STRENGTH (kgcm/cm$^2$) | |
| FIBER (%) | g/cc | DRY | SATURATED | DRY | SATURATED |
| 1 | 1.78 | 17.6 | 6.3 | 2.20 | 2.10 |
| 3 | 1.64 | 16.1 | 7.9 | 5.18 | 4.39 |
| 5 | 1.42 | 14.2 | 8.6 | 6.08 | 5.87 |
| 8 | 1.21 | 19.1 | 9.5 | 7.50 | 8.04 |

TABLE V-continued

| COMPOSITION | Normal curing PVA Fiber-cement TECHNICAL PROPERTIES | | | | |
|---|---|---|---|---|---|
| PVA | DENSITY | FLEXURAL STRENGTH (MPa) | | IMPACT STRENGTH (kgcm/cm$^2$) | |
| FIBER (%) | g/cc | DRY | SATURATED | DRY | SATURATED |
| 10 | 1.28 | 15.2 | 8.6 | 9.67 | 14.62 |

As can be seen, the sheets of polyvinyl alcohol fiber cement obtained by the process according to the invention have excellent impact strength.

EXAMPLE 6

Sheets of glass-fiber cement were manufactured by the process according to the invention.

The composition of the starting mixture used for the manufacture of these sheets was as follows:

| Components | Weight (kg) |
|---|---|
| Vermiculite (Grace No. 3): | 0.100 |
| Water: | 0.306 |
| Portland cement No. 10: | 1.800 |
| Glass-fibers: | 0.019 to 0.100 |

The sequence of steps for mixing the components of the composite material was substantially as disclosed in example 1.

The glass fibers that were used, were alcali-resisting fibers sold by Pilkington under the trademark CEMFIL No. FG.C.AR60/2. These fibers were added to the mixture without previous treatment.

The amounts of fibers that were added to the mixtures being processed, ranged from 0.019 and 0.100 kg in order to produce mixtures having 1, 3 and 5% by weight of fibers, respectively, with respect to the total weight of solid materials in the mixture.

Sheets were manufactured as disclosed in example 1 and subjected to ageing for 28 days under a relative 100% moisture atmosphere at a temperature of 22° C.

The mechanical characteristics of the sheets that were so manufactured, are given in table VI.

TABLE VI

| COMPOSITION | Normal curing Glass Fiber-cement TECHNICAL PROPERTIES | | | | |
|---|---|---|---|---|---|
| GLASS | DENSITY | FLEXURAL STRENGTH (MPa) | | IMPACT STRENGTH (kgcm/cm$^2$) | |
| FIBER (%) | g/cc | DRY | SATURATED | DRY | SATURATED |
| 1 | 1.90 | 14.3 | 6.7 | 1.75 | 1.55 |
| 3 | 1.82 | 13.0 | 6.6 | 2.08 | 2.21 |
| 5 | 1.69 | 13.4 | 5.3 | 2.10 | 2.60 |

EXAMPLE 7

Sheets made of a composite material using epoxy resin as a binder, were manufactured as disclosed hereinafter.

The composition of the starting mixture used for the manufacture of these sheets was as follows:

| Components | Weight (kg) |
|---|---|
| Vermiculite (Grace No. 3): | 0.400 |
| Epoxy resin: | 0.800 |
| Calcinated chrysotile fibers (FRITMAG ®): | 0.800 to 0.320 |
| Chrysotile fibers (grade 5): | 0.000 to 0.480 |

The epoxy resin binder that was used, came from Dow Chemical and comprised a resin component of trade name DER-331 and a hardener system of trade name DEH-24. The ratio of resin to hardener was of 100 to 12 parts by weight.

An amount of 0.800 kg of epoxy resin was found to be necessary to obtain composite materials which, in a finished form, have a water absorption lower than 0.30%. An amount of 0.400 kg vermiculite (Grace No. 3) was found to be the minimum amount of vermiculite necessary to absorb 0.800 kg of epoxy resin binder while keeping a dry aspect.

The amount of FRITMAG ® that was incorporated into the mixture, ranged from 0.800 to 0.320 kg whereas the amount of chrysotile fibers (grade 5) ranged from 0 to 0.480 kg in order to prepare mixtures having 0, 2, 4, 6, 8, 10, 12, 14, 16, 18, 20, 22 and 24 % by weight of fibers, respectively, with respect to the total weight of solid materials in the mixture.

Vermiculite was first introduced into a concrete mixer (MONARCH ®, model 147 type A) having a capacity of 0.175 cubic meter. Epoxy resin was then introduced and homogenized for 30 seconds. Then, the selected amounts of Fritmag and/or chrysotile fibers were added progressively in such a manner as to avoid formation of aggregates. The chrysotile asbestos fibers grade 5 were finally introduced into the mixture, that was homogenized for 30 seconds. The chrysotile fibers had previously been treated in a defibrator of the Willow type.

An amount of 2 kg of each mixture that was so prepared, was introduced into a 20 cm×40 cm mold of a press and compressed to a pressure of 3.5 MPa for 10 min. The temperature of the mold was held at 80° C. during the compression period. The sheets that were produced, were subjected to thermal treatment for 16 hrs at 105° C.

The mechanical characteristics of the sheets that were so obtained are given in table VII.

TABLE VII

| | Sheet with epoxy binder | | | |
|---|---|---|---|---|
| | Technical properties | | | |
| Composition Asbestos fiber Grade 5 (%) | Density g/cc | Water Absorption % | Flexural Strength MPa | Impact Strength kgcm/cm$^2$ |
| 0 | 1.67 | 0.17 | 46.5 | 2.46 |
| 2 | 1.70 | 0.15 | 53.5 | 2.67 |
| 4 | 1.73 | 0.22 | 60.6 | 3.67 |
| 6 | 1.70 | 0.24 | 62.0 | 4.05 |
| 8 | 1.72 | 0.23 | 59.9 | 3.69 |

TABLE VII-continued

| | Sheet with epoxy binder | | | |
| Composition Asbestos fiber Grade 5 (%) | Technical properties | | | |
| | Density g/cc | Water Absorption % | Flexural Strength MPa | Impact Strength kgcm/cm$^2$ |
|---|---|---|---|---|
| 10 | 1.72 | 0.24 | 59.2 | 3.45 |
| 12 | 1.72 | 0.24 | 61.3 | 3.94 |
| 14 | 1.73 | 0.27 | 59.9 | 3.86 |
| 16 | 1.71 | 0.26 | 64.8 | 4.39 |
| 18 | 1.69 | 0.22 | 64.1 | 4.43 |
| 20 | 1.70 | 0.26 | 64.1 | 4.33 |
| 22 | 1.70 | 0.25 | 69.0 | 5.00 |
| 24 | 1.69 | 0.30 | 71.8 | 5.29 |

As can be seen, the process according to the invention permits to manufacture composite materials having up to 40% by weight of epoxy resin, with water absorption lower than 0.30% and a content of a chrysotile asbestos fiber ranging from 0 to 24%. The flexural strength increased from 46.5 to 71.8 MPa whereas the impact strength ranged from 2.46 to 5.29 kg cm/cm2.

EXAMPLE 8

Sheets made of a composite material using polyester resin as a binder were manufactured as disclosed hereinafter.

The composition of the starting mixture used for the manufacture of these sheets was as follows:

| Components | Weight (kg) |
|---|---|
| Vermiculite (Grace No. 3): | 0.500 |
| Polyester resin: | 0.660 |
| Calcinated chrysotile fibers (FRITMAG ®): | 0.840 to 0.440 |
| Glass fibers: | 0.000 to 0.400 |

The Polyester resin binder that was used came from ARMKEM and comprised a resin component of trademark ARMKEM 906-174 and a catalyst system MEKP (methyl-ethyl-ketone-peroxide). The ratio of resin to catalyst was of 100 to 2 parts by weight.

An amount of 0.660 kg of polyester resin was the predetermined quantity of resin found to be necessary to obtain a composite material having, in finished form, a water absorption lower than 1%. An amount of 0.500 kg of vermiculite (Grace No. 3) was the minimum amount of vermiculite that was found to be necessary to absorb 0.660 kg of polyester resin while keeping a dry aspect.

The sequence of steps for mixing the components of the composite material was substantially as disclosed an example 7.

The glass fibers that were used, were sold by FIBERGLASS CANADA under the trade designation 360 (6 mm).

The amount of FRITMAG ® that was incorporated into the mixture ranged from 0.840 to 0.440 kg whereas the amount of glass fibers ranged from 0 to 0.400 kg in order to prepare mixtures having 0, 10, 15 and 20 % by weight of fibers, respectively, with respect to the total weight of solid materials in the mixture.

An amount of 2 kg of each mixture that was so prepared, was compressed to a pressure of 7 MPa for 10 min. The temperature of the mold was held at 60° C. during the compression period.

The sheets that were so produced were subjected to thermal treatment for 16 hours at 70° C.

The mechanical characteristics of the sheets that were so obtained are given in table VIII.

TABLE VIII

| | Sheet with polyester binder | | |
| Composition Glass fiber, % | Technical properties | | |
| | Density g/cc | Water Absorption % | Flexural Strength MPa |
|---|---|---|---|
| 0 | 1.86 | 1.00 | 40.9 |
| 10 | — | — | 50.0 |
| 15 | 1.91 | 1.00 | 52.5 |
| 20 | 1.74 | — | 65.8 |

We claim:

1. A process for manufacturing a composite material from a starting mixture comprising:
   a binder made up of two components capable of reacting with each other, at least one of these two components being in a liquid form;
   at least one filler; and
   reinforcing fibers; said binder being selected from the group consisting of:
   hydraulic cement and water;
   potassium and sodium silicate and water;
   colloidal silica and water; and
   organic resins and hardeners or catalysts; said filler and fibers being selected to be chemically compatible with said binder and to give said composite material some predetermined structure and properties;
   wherein said process comprises the steps of:
   selecting an absorbing substance that is capable of absorbing the liquid component of said binder and is compatible with the solid component of said binder, said filler and said fibers, said absorbing substance constituting said filler or being a part thereof;
   determining the minimum amount of said absorbing substance that is sufficient to absorb all of said liquid component while keeping a dry aspect;
   impregnating all of said liquid component into said determined amount of said absorbing substance;
   mixing said absorbing substance impregnated with said liquid component of said binder with said solid component of said binder, if any, with said filler and with said fibers in a mixer for a period of time sufficient to obtain the requested mixture in a semi-dry and homogenous form, in which the fibers are fully dispersed;
   introducing said semidry mixture into a mold of a press and compressing said mixture under pressure for a period of time depending on the composition of the starting mixture and the predetermined properties of said composite material to be obtained; and
   subjecting said compressed material to ageing and hardening as a function of the kind of binder being used, in order to obtain the desired composite material.

2. The process of claim 1, wherein the binder that is used, is made up of hydraulic cement and water.

3. The process of claim 1, wherein the binder that is used, is made up of colloidal silica and water.

4. The process of claim 1, wherein the binder that is used is made up of sodium or potassium silicate and water.

5. The process of claim 1, wherein the binder that is used, is made up of epoxy resin and a hardener for this resin.

6. The process of claim 1, wherein the binder that is used, is made up of polyester resin and of a catalyst for this resin.

7. The process of claim 1, wherein the substance that is used, constitutes said at least one filler or part thereof.

8. The process of claim 1, wherein the reinforcing fibers that are used, are selected from the group consisting of asbestos fibers, asbestos derivative fibers, cellulose fibers, glass fibers and plastic fibers.

9. The process of claim 1, wherein the absorbing substance that is used, is vermiculite.

10. The process of claim 2, wherein the absorbing substance that is used, is vermiculite.

11. The process of claim 3, wherein the absorbing substance that is used, is vermiculite.

12. The process of claim 4, wherein the absorbing substance that is used, is vermiculite.

13. The process of claim 5, wherein the absorbing substance that is used, is vermiculite.

14. The process of claim 6, wherein the absorbing substance that is used, is vermiculite.

15. The process of claim 7, wherein the absorbing substance that is used, is vermiculite.

16. The process of claim 8, wherein the absorbing substance that is used, is vermiculite.

* * * * *